No. 713,097.  
Patented Nov. 11, 1902.
J. A. HEYDRICK.
SCALE.
(Application filed Nov. 25, 1901.)
(No Model.)  
4 Sheets—Sheet 1.
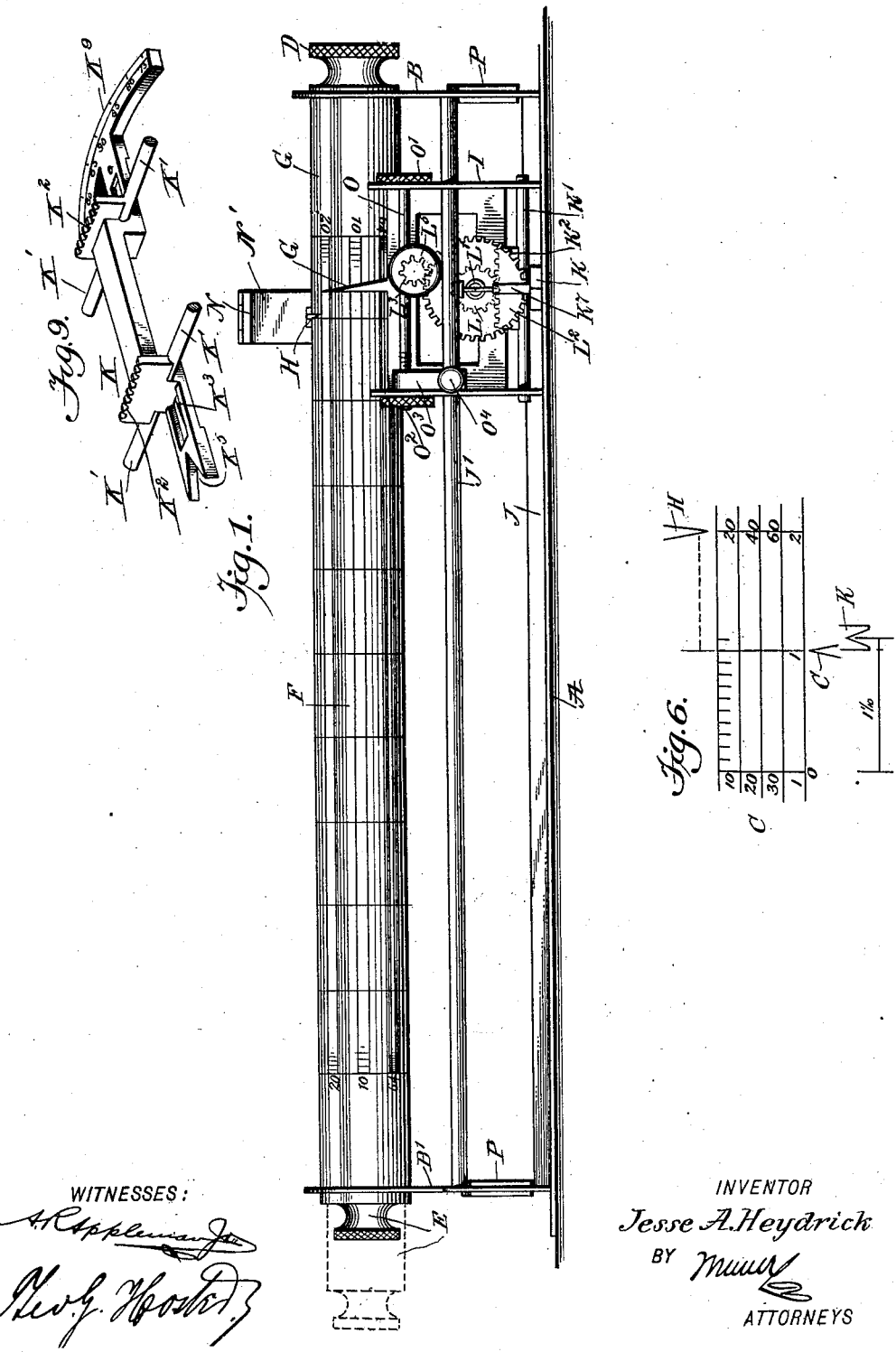
WITNESSES:
INVENTOR  
Jesse A. Heydrick  
BY   
ATTORNEYS

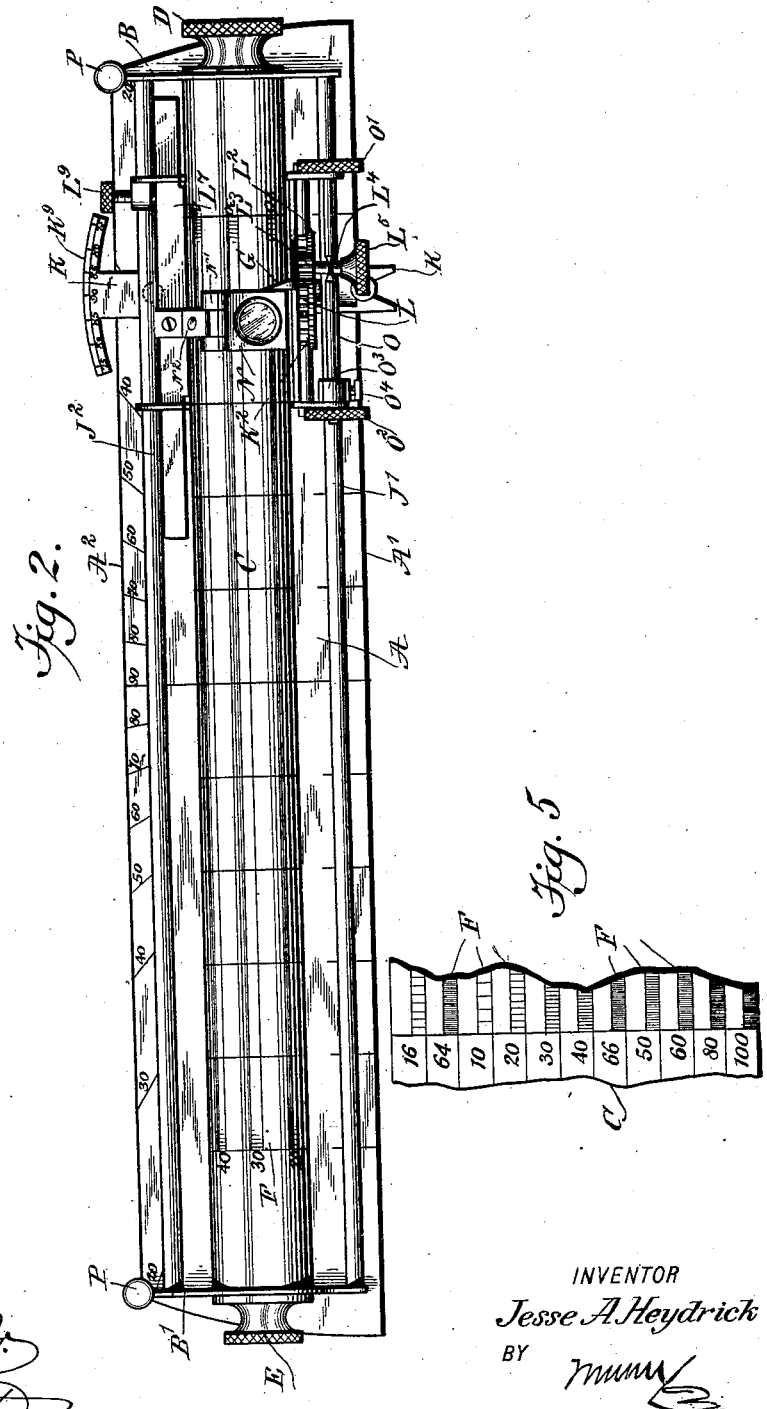

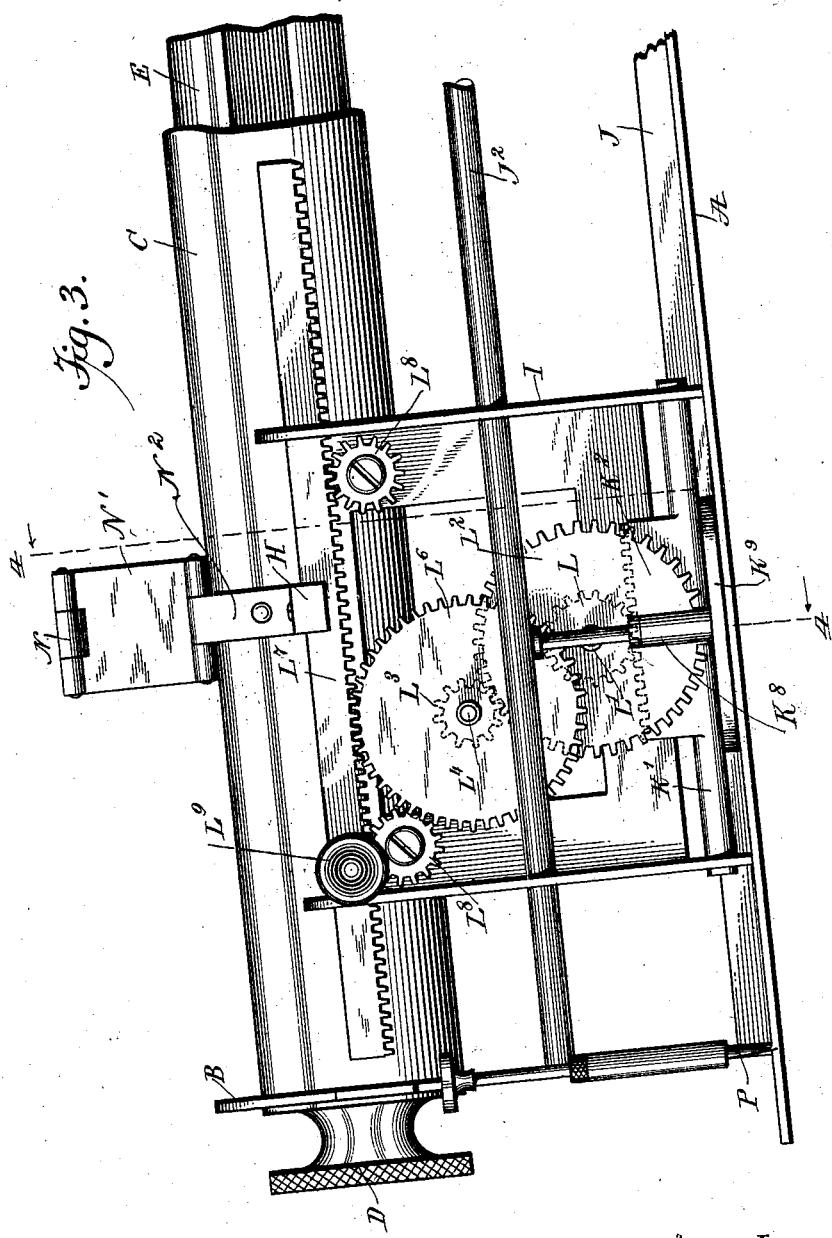

No. 713,097. Patented Nov. 11, 1902.
J. A. HEYDRICK.
SCALE.
(Application filed Nov. 25, 1901.)
(No Model.)
4 Sheets—Sheet 4.
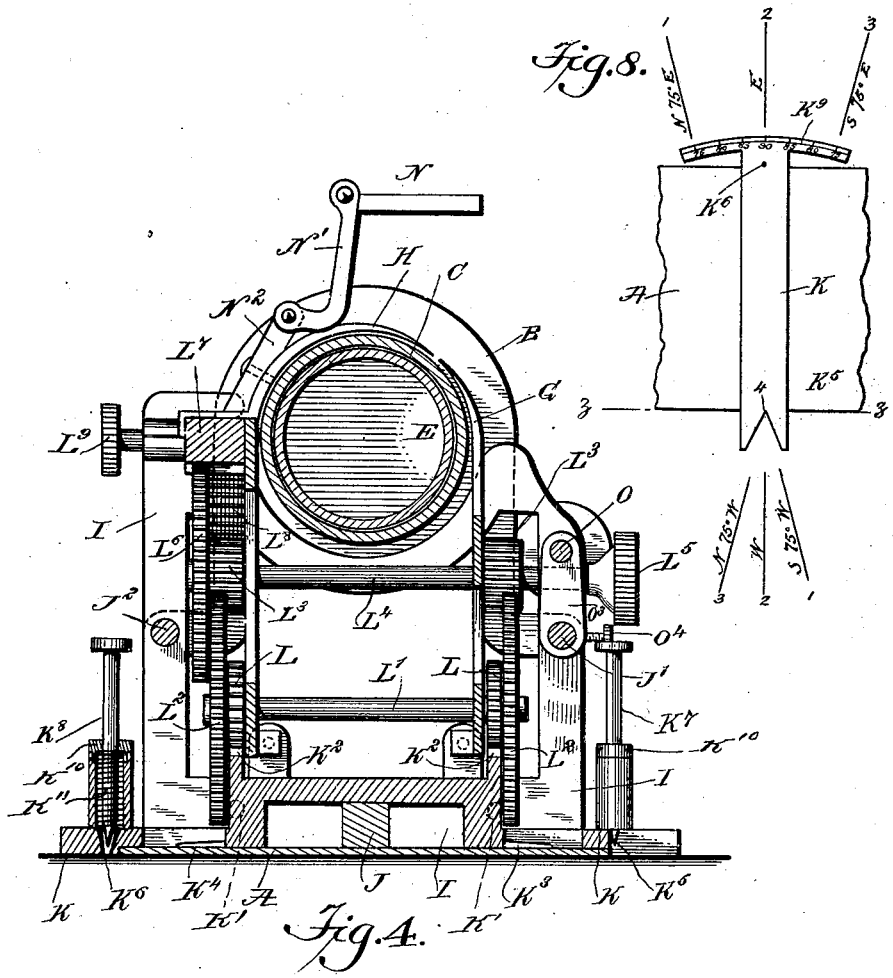
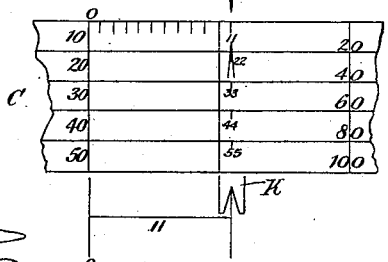
WITNESSES:
INVENTOR
Jesse A. Heydrick
BY
ATTORNEYS
THE NORRIS PETERS CO., PHOTO-LITHO., WASHINGTON, D. C.

UNITED STATES PATENT OFFICE.

JESSE A. HEYDRICK, OF BUTLER, PENNSYLVANIA.

SCALE.

SPECIFICATION forming part of Letters Patent No. 713,097, dated November 11, 1902.

Application filed November 25, 1901. Serial No. 83,539. (No model.)

*To all whom it may concern:*

Be it known that I, JESSE A. HEYDRICK, a citizen of the United States, and a resident of Butler, in the county of Butler and State of Pennsylvania, have invented a new and Improved Scale, of which the following is a full, clear, and exact description.

The invention relates to measuring instruments; and its object is to provide a new and improved scale more especially designed for the use of surveyors, engineers, draftsmen, and other persons and arranged to permit of conveniently and accurately finding the scale on which a plot, for instance, is drawn for reducing or enlarging drawings on any scale, for registering units of linear measure and decimal parts thereof from any and all scales used, for giving the angle from a line drawn on a plan or map at any point of the line, for drafting plans on any desired scale, and for other similar purposes too numerous to mention.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1 is a side elevation of the improvement. Fig. 2 is a plan view of the same. Fig. 3 is an enlarged rear side elevation of the same. Fig. 4 is a transverse section of the same on the line 4 4 of Fig. 3. Fig. 5 is an enlarged developed view of the scale on the scale-cylinder. Figs. 6, 7, and 8 are diagrammatic views showing the application of the instrument, and Fig. 9 is a perspective view of the decimeter or marking-bar.

On a base-plate A are erected standards B B', in which is journaled a scale-cylinder C, provided at the end next to the standard B with a knob D to permit the user to conveniently turn the scale-cylinder in its bearings until the desired position is reached, as hereinafter more fully explained. Into the other open end of the cylinder C is removably inserted a cylindrical drawer E for storing pencils and the like. On the peripheral face of the cylinder C are arranged longitudinally-extending linear graduations F, which, as shown in detail in Fig. 5, represent inches divided into equal parts, preferably ten, sixteen, twenty, thirty, forty, fifty, sixty, sixty-four, sixty-six, eighty, and one hundred parts. On the graduations, indicate pointers G and H, of which the main pointer G is rigid on a carriage I, mounted to slide longitudinally on a guideway formed of parallel bars J J' J², secured to the standards B and B'. On the lower portion of the carriage I is mounted to slide longitudinally a transversely-extending decimeter or marking-bar K, formed at each end, close to the front and rear edges of the base-plate A, with recesses or openings for inserting a pencil or other marking-tool. The front and rear edges of the base-plate A are provided with graduations A' and A², of which the graduation A' represents linear measurement in inches and the graduation A² indicates degrees and forms a protractor. The bar K forms part of a slide K', mounted to slide longitudinally on the carriage I, and on the said slide K' are arranged racks K², in mesh with pinions L, secured on a shaft L', extending transversely and mounted to turn in suitable bearings arranged on the carriage I. On the shaft L' are secured gear-wheels L², in mesh with pinions L³, attached to a second transverse shaft L⁴, likewise journaled in the carriage I and carrying at its forward end a knob L⁵, adapted to be taken hold of by the operator to turn the shaft L⁴ to rotate the pinions L³, which in turn rotate the gear-wheels L², the shaft L', and pinions L to cause the latter to move the racks K², and consequently the slide K', with the bar K in a longitudinal direction, either to the right or to the left, according to the direction in which the knob L⁵ is turned. The bar K is provided with transversely-extending fixed points or pointers K³ and K⁴ for indicating the exact position of the bar on the graduations A' and A², the pointers K³ K⁴ being in transverse alinement with the marking-openings K⁵ and K⁶ on the outer ends of the bar K, adjacent to the edges of the base-plate A. The bar K is provided with spring-pressed vertically-slidable pins or markers K⁷ and K⁸, which when pressed pass through the openings K⁵ and K⁶ to record on the paper the graduations and decimal parts thereof indicated by the pointers G and H on the scale-cylinder C. On the rear end of the shaft L⁴ (see Fig. 3) is secured a gear-wheel L⁶, in mesh with a rack L⁷, mounted to slide in longitudinal bearings arranged on the carriage I, the rack also traveling on idlers L⁸, journaled on the said carriage. On the rack L⁷ is secured the transversely-extending pointer H, previously mentioned, the said pointer extending close to the pointer G, and over the pointer H is arranged a magnifying-glass N, pivoted on a link N', hinged on an arm N², attached to the rack L⁷ and moving with the same. The magnifying-glass can be folded back upon the link N' and then swung with the latter rearward onto the rack L⁷ when it is not desired to use the magnifying-glass. A set-screw L⁹ screws on the carriage I against the rack L⁷ to lock the latter in its bearing in the carriage whenever it is desired to do so and after the desired adjustment of the pointer H and bar K has been made.

The carriage I, with the parts mounted thereon, is shifted by hand to the desired position, and in order to obtain a very accurate position of the carriage I provide an adjusting device arranged as follows: On the carriage I is journaled a longitudinally-extending screw-rod O, carrying on one end a knob O' for turning the screw-rod, and on the threaded end is arranged a nut O², adapted to abut against one side of the carriage to lock the screw-rod O in place whenever it is desired to do so. On the threaded end of the screw-rod O also screws a nut O³, mounted to slide on the guideway-bar J', and this nut O³ is provided with a set-screw O⁴ for securing the nut in position on the guideway-bar J', so that when the nut is fastened in position on the said guideway-bar and the screw-rod O is turned a minute adjustment in a longitudinal direction is given to the carriage I and the parts carried thereby as the nut is held stationary and the screw-rod O screws to the right or to the left in the said nut, according to the direction in which the knob O' is turned.

On the rear corners of the base-plate A are held vertically-disposed sliding pins P for fastening the base-plate in position on a drawing-board while using the device. The pins P are similar to the pins K⁷ K⁸, (see Fig. 4,) each of which is mounted to slide vertically in a bearing K¹⁰ and is normally held in an uppermost position by a spring K¹¹. (See left side of Fig. 4.)

The gearing described for moving the bar K and the pointer H simultaneously is so proportioned that the pointer H moves ten times as fast as the bar K on the operator turning the knob L⁵.

One of the most important uses of the instrument is to find whole units and decimal fractions thereof. For instance, as shown in the diagrammatic view, Fig. 6, it is desired to find along a line one whole unit and one-tenth thereof. In order to do this, the operator places the base-plate with the edge A' along the line and the pin K⁷ of the bar K standing at zero along the edge A' and at the beginning of the line and the pointers G and H both standing at zero on the graduation indicating one inch. The pins P P are now pressed downward to secure the instrument in place on the map, drawing-board, table, or other support on which the sheet containing the line is held. The operator now shifts the carriage I along until the pin K⁷ stands at one inch on the graduation. The operator now turns the knob L⁵ and watches the pointer H until the latter has moved to two inches on the graduation. Now as the bar K and the pointer H move at the ratio of one to ten it is evident that the bar K has moved one-tenth of an inch beyond the one-inch mark. The pointer G remains stationary during the turning of the knob L⁵, thus indicating the unit or whole number, while the pointer H and bar K hunt up the decimal part. If it is desired to find, say, one one-hundredth of an inch, the operation above described is repeated, with the exception that the knob L⁵ is turned only until the pointer H stands on the first one-tenth beyond the one inch of the graduation on the cylinder C. From the foregoing it is understood that the movement of the pointer H in either direction from a unit or any scale on the scale-cylinder moves the bar K one-tenth of the distance of that scale and in the same direction in which the pointer H is moved. Thus if the pointer H is moved, say, three points on the scale 10 of cylinder C the bar K moves three one-hundredths of an inch and when moved, say, nine points on the scale 50 then the bar K moves nine five-hundredths of an inch and when moved three points on scale 100 the bar K moves three one-thousandths of an inch. Thus the instrument mechanically gives the one-tenth or any number of one-tenth of any unit of linear measure placed on the scale-cylinder C.

Fig. 7 illustrates the finding of a scale when the distance of a line is given. In this case the base-plate is arranged along the line the same as above described, the bar K standing at one end of the line and at zero on the edge A' and the pointers G and H standing at zero on the scale-cylinder C. The carriage I is now shifted by hand until the bar K is at the end of the line, and as the latter is marked "11" the operator turns the cylinder C until eleven points on any one of the scales, counting from zero, registers with the pointers G and H. Thus, as shown, scale 10 fills the requirement—that is, the line 11 is drawn to scale of one to ten.

Fig. 8 represents a plate A and a bar K, the rear end K⁹ of which is graduated in degrees to form a protractor. The bar K always stands at right angles to the plate A and at right angles to the line drawn on plan along z z. A point at 4 and one at 2 would be at right angles or ninety degrees from z z at any point along z z. A line drawn from 4 to 1 gives an angle of seventy-five degrees, or, as marked on plan, "north seventy-five degrees east and south seventy-five degrees west and from 4 to 3 gives south seventy-five degrees east and north seventy-five degrees west." This gives the course or angle from any point on the plate A for fifteen degrees each side of a right angle without adjusting the protractor to said line, thus saving time. To enlarge or reduce a plan, first find the scale on which the orginal plan is drawn and then place the instrument on the plan, with its scale adjusted to the pointers. Noting the angle of the line to be changed leaves the last line, and if it comes within the province of the movable protractor on the bar K or is found by the main protractor $A^2$ read the distance and angle. Noting them on paper as either a multiple or decimal the operator can readily shift the carriage and pointers to the proper position on the scale-cylinder C. If to change to a different scale, turn the scale-cylinder C and arrange the carriage and pointer to read the same number of units and one-tenth on the new scale. Thus if it is desired to change scale 10 to one hundred take one-tenth of distance, but if to thirty find distance—say fifty—on scale 10, then turn scale 30 in place and move carriage and pointer to "50" on scale 30. Having noted angle and distance on paper, then move instrument to new plot and record, &c.

Having thus described my invention, I claim as new and desire to secure by Letters Patent—

1. A device of the class described, comprising a base-plate, a bar extending transversely of the base-plate and movable longitudinally relative to the base-plate, the front end of the bar having a marking-opening coinciding with the front edge of the base-plate, and the rear end of said bar being provided with a fixed protractor, the center of which is the said marking-opening, as set forth.

2. A device of the class described having a base-plate, a marking-bar extending transversely of the base-plate and movable bodily, lengthwise of the plate, a pointer movable in the same direction as the marking-bar and at a differential rate of speed relative to the marking-bar, a scale for the pointer to indicate on, and manually-controlled means for imparting a simultaneous movement to the said bar and pointer, as set forth.

3. A device of the class described, having a base-plate, a marking-bar extending transversely of the base-plate and movable bodily lengthwise of the plate, a pointer movable in the same direction as the said marking-bar and at a ratio of ten to one, a scale for the pointer to indicate on, and means for imparting simultaneous movement to the said bar and pointer, as set forth.

4. A device of the class described, comprising a base-plate, a carriage movable on the base-plate in the direction of its length, a revoluble scale-cylinder journaled on the base-plate and having graduations extending lengthwise on the peripheral face of the cylinder, the graduations representing inches divided into equal parts, a pointer on the said carriage and indicating on the graduations, and a bar movable on the said carriage and having a marking-opening on the front edge of the said base-plate, as set forth.

5. A device of the class described, comprising a base-plate, a carriage movable thereon and carrying a pointer, a revoluble scale-cylinder journaled on the base-plate and having divisional graduations of a linear-measure unit and on which indicates the said pointer, and a bar adjustable on the said carriage, and having a protractor on the rear end from which angles can be taken from any point along a line on which the edge of the base-plate is placed, as set forth.

6. A device of the class described, comprising a base-plate, a carriage movable thereon and carrying a pointer, a revoluble scale-cylinder journaled on the base-plate and having divisional graduations of a linear-measure unit and on which indicates the said pointer, a bar adjustable on the said carriage, a second pointer indicating on the said cylinder graduations, and means for adjusting the said second pointer simultaneously with the said bar so as to register the decimal parts of the graduations used, as set forth.

7. A device of the class described, comprising a base-plate carrying standards and a longitudinal guideway, a carriage slidable in the guideway, a scale-cylinder turnable in the standards, a pointer on the carriage, and means for minutely adjusting the carriage on the said guideway to bring the pointer in proper position on a scale on the said cylinder, as set forth.

8. A device of the class described, provided with a scale-cylinder mounted to turn, a slidable carriage carrying a fixed pointer for indicating on the scales of the said cylinder, a movable pointer on the carriage, and an indicating-bar movable on the carriage and differentially relative to the said movable pointer, as set forth.

9. A device of the class described, provided with a scale-cylinder mounted to turn, a slidable carriage carrying a fixed pointer for indicating on the scales of the said cylinder, a movable pointer on the carriage, an indicating-bar movable on the carriage and differentially relative to the said movable pointer, and a gearing under the control of the operator and carried by the said carriage to impart simultaneous movement to the bar and movable pointer, as set forth.

10. A device of the class described, having a base-plate provided at one edge with a graduation indicating degrees, and a bar movable on the said base-plate and having an opening for indicating the center of the said graduation, the said opening extending at the other edge of the said base-plate, as set forth.

In testimony whereof I have signed my name to this specification in the presence of of two subscribing witnesses.

JESSE A. HEYDRICK.

Witnesses:
L. P. WALKER,
T. H. WALKER.